${}^{3,325,539}$

United States Patent Office 3,325,539
Patented June 13, 1967

3,325,539
ION EXCHANGE PROCESS FOR REMOVING GLUTAMIC ACID FROM A FERMENTATION BROTH
David A. Conklin, Berkeley Heights, and James Gillin, Westfield, N.J., assignors to Merck & Co., Inc., Rahway, N.J., a corporation of New Jersey
No Drawing. Filed Nov. 19, 1962, Ser. No. 238,720
6 Claims. (Cl. 260—527)

This invention relates to a method for separating glutamic acid and salts thereof from an aqueous solution and more particularly to a process for removing glutamic acid and salts thereof from a fermentation broth by ion exchange techniques.

The method of recovering glutamic acid from aqueous solutions by ion exchange has been generally employed where the aqueous glutamic acid solutions were derived from such sources as beet sugar wastes and synthetic organic reaction solutions. The method is not generally suitable for treating a glutamic acid source derived from fermentation processes because these sources usually contain large amounts of solid materials either in the form of by-produced inorganic materials or, as is most likely and more prevalent, in the form of bacterial cells. These solids would plug the resin bed under the ordinary methods employed leading to frequent shut downs and cleaning operations.

It has now been discovered that fermentation broths containing glutamic acid and salts thereof and solid material may be submitted directly to ion change treatment without filtering the fermentation broth prior to the exchange procedure by flowing the unfiltered fermentation broth upflow through an expanded bed of appropriate ion exchange material.

The present invention further provides an improvement in the elution of glutamic acid from the ion exchange material whereby considerable purity of the eluate is obtained. This is achieved by employing a sodium hydroxide solution of specific normality as the eluent and conducting the elution at a slightly elevated temperature as will be more fully described hereinafter.

In practicing the method of the present invention unfiltered fermentation broth is passed upflow through a cation exchange resin at a rate great enough to expand the resin bed yet slow enough to maintain the bed in a unitary form. Under some conditions, "boiling away" of resin particles at the surface of the bed will be unavoidable, nevertheless the flow of liquid should not be so great as to flow resin out the top of the column. The degree of bed expansion necessary for the operation of the instant process, ranges from 1.05 to 1.6 times the original bed depth with values in the range of 1.1–1.4 being preferred. To facilitate this phase of the invention it is convenient to use a resin column having an effective height of about twice the height of the rested resin bed.

The particular liquid flow rates of conventionally obtained fermentation broth through the resin bed to achieve a given expanded state will depend upon the apparent density and effective size of the cation exchange resin particles employed. For the commercially available resins, the densities are about 50 to 60 lbs./cubic ft. for a back washed and rinsed bed, and the particle sizes are generally in the range of 15 to 70 mesh with about 90% of the particles in the range of from 20 to 40 mesh. Using such resins, volume flow rates of fermentation broth of from about 1–8 gal./min./ft.$^2$ based on bed cross section will be sufficient to maintain the bed in an expanded state suitable for the process of the present invention. The preferred flow rate, however, is from 2–3 gals./min./ft.$^2$. It will be appreciated that the actual values used may be varied depending on the resin employed, temperature and viscosity of the fermentation broth.

As a result of this phase of the invention, essentially all of the solid material present in the broth passes through the voids created by the expansion and flows out the top of the resin column with the effluent stream. There is thus, no plugging of the resin bed due to the accumulation of solid material. Moreover, the instant invention does not require the use of mechanical means for "holding down" resin particles such as screens, agitators and the like since these would likewise hold back the very solid materials desired to be removed in the effluent. In contrast, using current downflow processes, solid materials are trapped at the top of the resin bed and fail to pass therethrough causing the plugging problem referred to. Relative to the size of the resin particles, the method of the present invention is effective on essentially all of the smaller particles and most of the larger particles normally observed in the fermentation broth since these solids are generally much less dense than the resin particles. Unusually large particles, that is, solids about the same size as the support material under the resin bed, when present, will probably be forced against the underside of the support material and will not pass through the bed. This, however, is of no consequence since the accumulation of material in this area is minor and does not affect the efficient operation of the column. Generally, the resin becomes saturated with glutamic acid much before an appreciable amount of solids accumulates under the support.

As the fermentation broth contacts the cation exchange resin essentially all of the cations and glutamic acid present in the broth are adsorbed onto the resin. The flow of broth is continued until the resin becomes essentially loaded or saturated with glutamic acid and its accompanying cationic impurities. This point can be determined by monitoring the column effluent and observing when glutamic acid begins to "break through" the resin bed. It is preferred however, to discontinue the flow of fermentation broth just prior to the fully loaded point such that removal of residual broth from the column will not result in desorption of glutamic acid in favor of preferentially adsorbed cations. This point may be determined by those skilled in the art from knowledge of resin regenerated capacity, relative concentrations of adsorbables in the broth, amount of broth treated and the like. After the adsorption is discontinued, the column and resin bed are washed with water to remove residual solids within the system. Preparatory to the elution, it is preferred that the resin bed be heated to a temperature in the range of from 40 to 60° C. and the subsequent elution carried out at this temperature by either heating the bed or using a heated eluent. Desirably, the initial bed heating is achieved in the preceding cleaning step by using warm wash water.

The elution step itself contemplates flowing a 0.5–2 N warm sodium hydroxide solution downflow through the resin bed to elute the glutamic acid therefrom. This range of concentration is critical to obtain maximum concentration of glutamic acid in the eluate. The actual normality of the sodium hydroxide solution employed within this range depends on the concentration of glutamic acid equivalents absorbed on the resin relative to the cationic impurities also present thereon. This is dependent upon the concentration of the glutamic acid equivalents in the fermentation broth relative to the adsorbable cations therein. For the commercially obtained fermentation broths the ranges of glutamic acid equivalents are usually 0.14–0.5 equivalent per liter, and the adsorbable cations range from about 0.6–0.9 equivalent per liter. The above-indicated sodium hydroxide normality ranges are effective in obtaining the glutamic acid in maximum amounts in the eluate. The preferred eluent concentration, however, is from 0.7–1.8 N.

It will be appreciated that the initial portion of the eluate will contain relatively large amounts of water since the water used in the preceding cleaning step must be displaced by the eluent. For this reason, it is preferred to discard that first portion of the eluate which contains up to about 10 gm. of glutamic acid per liter of solution. The next portion of eluate is thereafter collected until its pH rises to about 8. At this point the elution is discontinued and the glutamic acid recovered from the collected eluate by adjusting the pH of the solution to the isoelectric point of glutamic acid, about 3.2, at which point glutamic acid will be precipitated in maximum yield. The residual amount of glutamic acid on the resin may be desorbed with additional sodium hydroxide solution and the resulting eluate recycled with fresh fermentation broth if desired. During the elution it is possible, under some conditions, for the glutamic acid to crystallize on the resin material. This may be observed to occur at the higher end of eluent concentrations or at the lower end of resin temperatures, or with combinations or these variables. In such an instance the solid glutamic acid may be readily removed by washing the resin with a quantity of warm water.

The pH of the whole broth before it is submitted to the ion exchange process is not critical with respect to the invention, and values ranging from 1–11 are suitable. It is preferred for practical purposes to employ pH above the isoelectric point of glutamic acid and most preferably one between 4.5–6.

The cation exchange resins employed in the process of the present invention are the strongly acidic cation exchange type of the sulfonated polystyrene class and are widely available from a variety of commercial sources. For example, they are manufactured under the names Amberlite IR 120 and Amberlite 200 by Rhom and Haas, Philadelphia, Pa.; Dowex 50 by the Dow Chemical Company, Midland, Michigan; Ionac C240 from the American Zeolite Corporation; Permutit Q by Permutit Company, New York, N.Y. The resins are used in their $H^+$ form and may be regenerated in the conventional manner.

The following examples are presented for purposes of illustration only and are not to be considered as limiting the present invention.

*Example 1*

Sulfuric acid, 30.3 liter of 1.81 N is passed downflow at 825 ml./min. (2.5 gal./min./ft.$^2$) through 26.9 liters of a sulfonated polystyrene strongly acidic cation exchange material (Amberlite IR–120) contained in a 4" x 20' glass column. The resin is then water washed, at the same rate, until the effluent is less than 0.1 N (approximately 24 liters of water). After the resin bed is expanded 10–15 percent by upflow water wash a quantity of fermentation broth, pH 6.6, containing 29.4 equivalents of cations (11.0 equivalents glutamic acid, 18.4 equivalents of inorganic cations) is passed upflow at 800–1000 ml./min. followed by 52 liters of 50–60° C. water. After allowing the resin to settle 15 minutes, the liquid above the bed is removed via a siphon. The total spent broth effluent contains 5 grams of glutamic acid. The resin is then eluted by passing downflow at 825–1000 ml./min. 28.7 liters of 0.9 N sodium hydroxide followed by sufficient 50–60° C. water to displace the glutamic acid from the column. Three eluate fractions are taken, forerun, richcut and tailcut. The richcut is initiated when the glutamic acid concentration of the eluate rises to 15 gm./l. and terminates when the pH reached 7–8. The elution is concluded when 6.0 liters of tailcut is collected. The total eluate contains 1563 grams (97 percent) of glutamic acid of which 1.9, 92.7, and 5.4 percent is in the forerun, richcut and tailcut respectively. The glutamic acid in the richcut (72 gm./l.) is recovered by pH adjustment to 3.2 and subsequent filtration.

*Example 2*

The procedure used is essentially the same as given in Example 1 except that a gel structure variant of the resin of Example 1 is used (Amberlite IR 200) and the column feed is composed of a quantity of fermentation broth (pH 6.8) containing 1181 grams of glutamic acid and a quantity of prior process mother liquors containing 286 grams of glutamic acid. The spent broth effluent contains 19 grams of glutamic acid. The resin column is eluted as in Example 1 and the glutamic acid in the richcut, at a concentration of 78 gm./l., isolated after crystallization. There is obtained 973 grams of pure glutamic acid. The forerun and tailcut from the elution contained 18 and 51 grams of glutamic acid respectively. By assay, 345 grams of glutamic acid remained in the crystallization liquors.

*Example 3*

The procedure used is essentially the same as in Example 1 except that the column feed which contains 1403 grams of glutamic acid is adjusted with sulfuric acid to pH 2.5.

The spent broth effluent contains 9 grams of glutamic acid. The total eluate contains 1318 grams (93.9 percent) of glutamic acid of which 2.3, 94.8 and 2.9 percent is in the forerun, richcut and tailcut respectively. The glutamic acid concentration of the richcut is 63 gm./l.

*Example 4*

The procedure used is essentially the same as in Example 1 except that the column feed (pH 6.8) contains 1238 grams of glutamic acid and the eluent is 1.5 N sodium hydroxide.

The spent broth effluent contains less than 10 grams of glutamic acid. The total eluate contains 1213 grams (98.0 percent) of glutamic acid of which 1.1, 96.9 and 2.0 percent is in the forerun, richcut and tailcut respectively. The glutamic acid concentration of the richcut is 98/gm./l.

*Example 5*

The procedure of Example 1 is followed except that the column feed (pH 6.8) contains 1493 grams of glutamic acid and the eluent is 0.5 N sodium hydroxide.

The spent broth effluent contains 15 grams of glutamic acid. The total eluate contains 1325 grams (88.7 percent) of glutamic acid of which 0.8, 96.7 and 2.5 percent is in the forerun, richcut and tailcut respectively. The glutamic acid concentration of the richcut is 35 gm./l.

*Example 6*

The procedure of Example 1 is followed using a column feed composed of fermentation broth (pH 7.4) containing 1549 grams of glutamic acid. The eluent, which is 0.9 N sodium hydroxide contains the forerun and tailcut from a previous column run. A total of 44 grams of glutamic acid is present in the eluent.

The spent broth effluent contains 8 grams of glutamic acid. The total eluate contains 1556 grams (97.7 percent) of glutamic acid of which 0.6, 96.8, and 2.6 percent is in the forerun, richcut and tailcut respectively. The glutamic acid concentration of the richcut is 77 gm./l.

Any departure from the above description which conforms to the present invention is intended to be included within the scope of the claims.

What is claimed is:

1. A method for separating glutamic acid and salts thereof from a fermentation broth containing the same and solid materials which comprises passing fermentation broth containing glutamic acid, salts thereof, and solid materials upflow through a bed of strongly acidic cation exchange resin on the hydrogen cycle at a rate sufficient to expand the bed between 1.05 and 1.6 times its original depth, thereby adsorbing glutamic acid on said resin, discontinuing the flow of fermentation broth over said resin and eluting said adsorbed glutamic acid from said resin with a 0.5–2 N sodium hydroxide solution at a temperature greater than 40° C., said elution being effected by passing said sodium hydroxide solution downflow over said resin bed.

2. The method according to claim 1 wherein the eluting step is further characterized in that there is separately collected an eluate containing greater than 10 gm. of glutamic acid per liter of solution and having a pH of not greater than 8.

3. The method according to claim 2 wherein the eluting step is carried out at a bed temperature of between 40° C. and 60° C.

4. The method according to claim 3 wherein the eluate is treated to precipitate glutamic acid therefrom.

5. The method according to claim 3 wherein the eluate collected is treated to adjust its pH to about 3.2.

6. A method for separating glutamic acid and salts thereof from a fermentation broth containing the same which comprises passing unfiltered fermentation broth containing glutamic acid upflow through a bed of strongly acidic cation exchange resin of the sulfonated polystyrene type on the hydrogen cycle at a rate sufficient to expand the bed between 1.05 and 1.4 times its original depth whereby the glutamic acid is adsorbed on said resin, discontinuing the flow of fermentation broth over said resin, eluting said adsorbed glutamic acid from said resin with a 0.5–2 N sodium hydroxide solution at a temperature of from 40–60° C. to obtain an eluate, collecting that portion of the eluate which contains greater than 10 gm. of glutamic acid per liter of solution and has a pH not greater than 8, and treating said eluate to precipitate glutamic acid therefrom.

References Cited

UNITED STATES PATENTS

| | | | |
|---|---|---|---|
| 2,528,047 | 10/1950 | Fitch | 260—527 |
| 3,000,792 | 9/1961 | Denkewalter et al. | 195—116 |
| 3,080,297 | 3/1963 | Phillips et al. | 195—147 |

LORRAINE A. WEINBERGER, *Primary Examiner.*

IRVING R. PELLMAN, *Assistant Examiner.*